United States Patent [19]

Plasser et al.

[11] 3,769,715
[45] Nov. 6, 1973

[54] MOBILE TRACK SURVEY APPARATUS FOR DETERMINING THE TRACK CAMBER

[76] Inventors: Franz Plasser; Josef Theurer, both of Johannesgasse 3, Vienna, Austria

[22] Filed: June 24, 1971

[21] Appl. No.: 156,225

[30] Foreign Application Priority Data
July 2, 1970  Austria.................................... 5962

[52] U.S. Cl.................. 33/338, 33/144, 33/DIG. 13, 73/88.5 SD
[51] Int. Cl........................... B61k 9/08, E01b 29/00
[58] Field of Search...................... 33/144, 146, 338, 33/DIG. 13, 1 PT; 73/88.5 SD

[56] References Cited
UNITED STATES PATENTS
| 2,784,496 | 3/1957 | Rousse.................................. 33/338 |
| 2,581,264 | 1/1952 | Levesque........................ 33/DIG. 13 |
| 2,761,216 | 9/1956 | Gollub............................ 33/DIG. 13 |
| 367,708 | 8/1887 | Dudley................................. 33/144 |
| 3,604,359 | 9/1971 | Dorley................................. 33/144 |
| 3,392,451 | 7/1968 | Lombardo........................... 33/144 |

*Primary Examiner*—William D. Martin, Jr.
*Assistant Examiner*—Milton S. Gerstein
*Attorney*—Kurt Kelman

[57] ABSTRACT

Two sensing elements each engaged with both rails and spaced apart in the track elongation direction survey the vertical positions of the rails at four points defining a rectangle. An elastically deformable rod interconnects the sensing elements so that a difference in the vertical positions of the rails deforms the rod in response to a vertical movement of a sensing element. The deformation of the rod causes a strain to be set up in the rod and a resistance strain gage on the rod measures this strain and generates an electrical measuring signal proportional to the movement of the sensing element. An electrical measuring signal indicator is connected to the strain gage to indicate the signal.

4 Claims, 8 Drawing Figures

PATENTED NOV 6 1973
3,769,715
SHEET 1 OF 2
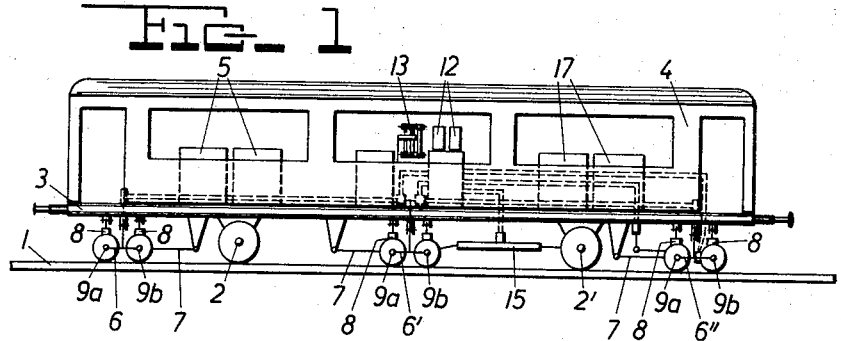
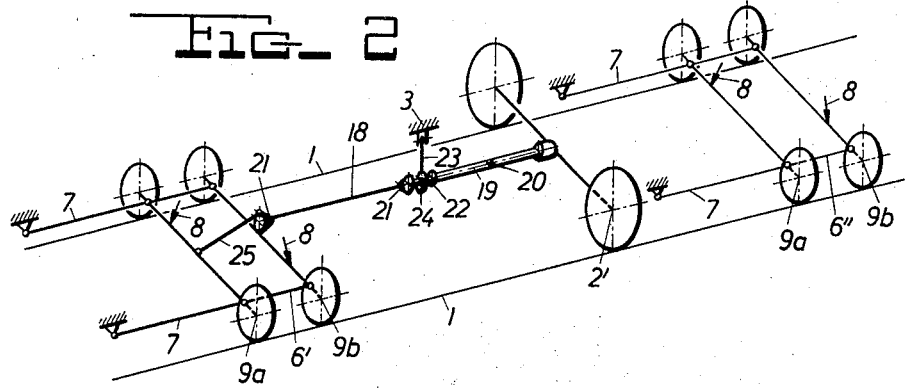
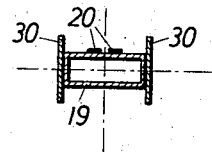
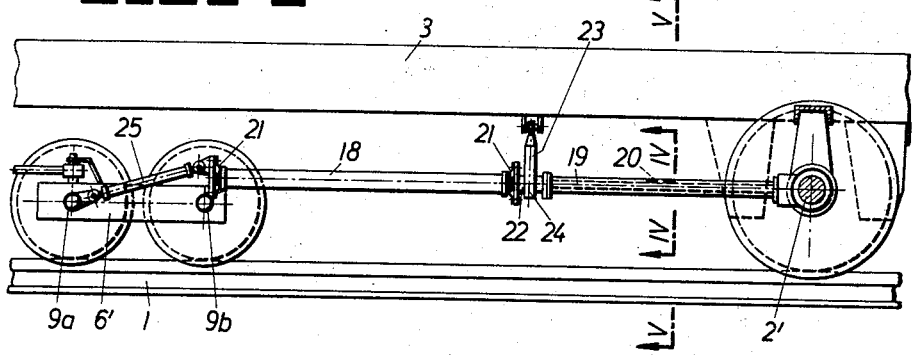
INVENTORS
FRANZ PLASSER
JOSEF THEURER
BY
Kurt Kelman
AGENT

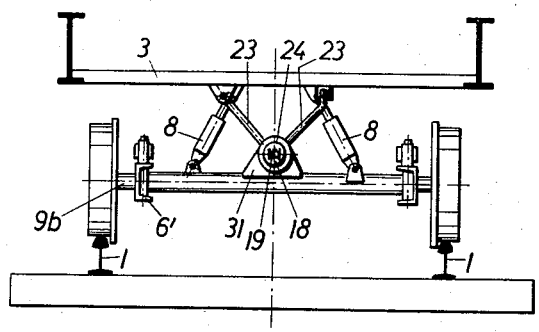
Fig. 5
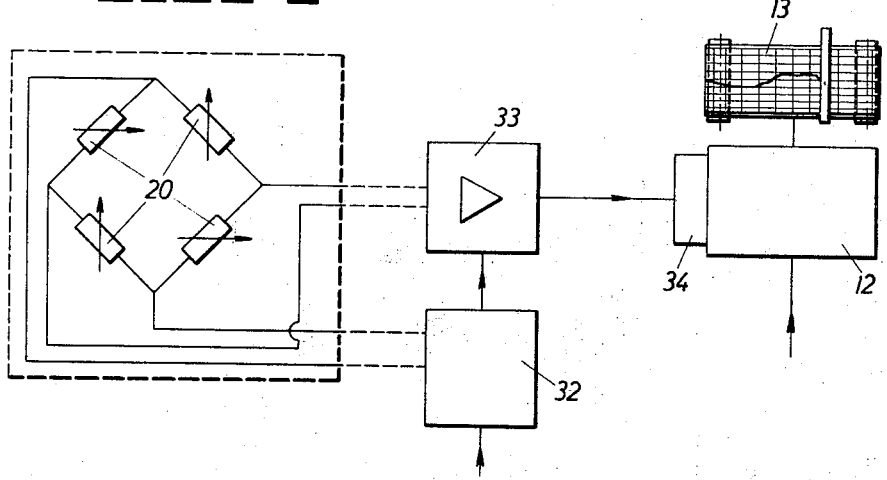
Fig. 6
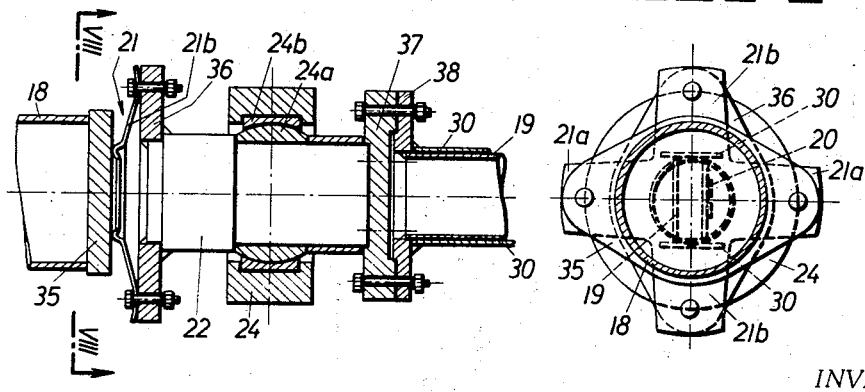
Fig. 7
Fig. 8
INVENTORS
FRANZ PLASSER
JOSEF THEURER
BY
Kurt Kelman
AGENT

MOBILE TRACK SURVEY APPARATUS FOR DETERMINING THE TRACK CAMBER

The present invention relates to improvements in mobile track survey apparatus designed to determine the camber of a track, i.e. a warpage of at least one of the two track rails which causes one of the points of a rectangle of four rail points to lie outside the plane defined by the three other rail points, which imparts a twist to the track.

Apparatus of this general type is known wherein two sensing elements, such as axles having flanged wheels, each engaged with both rails are spaced apart in the track elongation direction whereby the engaged sensing elements survey the vertical position of each rail. A measuring mechanism interconnects the two sensing elements so that it measures the angle between the two axles of the sensing elements in a plane extending transversely of the track as the apparatus moves in the track elongation direction. The resultant measuring signal is transmitted to an indicator and/or recorder. The measuring mechanism consists of a lever system or the like which is subject to errors and/or operating difficulties.

It has also been proposed to measure the camber of a track by means of four rail engaging wheels forming a rectangle and resiliently supporting a chassis. The vertical movement of each wheel in respect of the chassis was electrically measured and the four electrical measuring devices were connected to form an electrical measuring bridge producing a measuring signal corresponding to the track camber. In addition to being quite expensive, this arrangement has the additional disadvantage of falsifying the camber readings because the vibrations of the chassis enter into the measurements.

It is the primary object of this invention to overcome these and other disadvantages and to provide a track survey apparatus with instrumentation which is not only simple and, therefore, inexpensive to manufacture and operate but also accurately determines the track camber independently of the vibrations of the apparatus.

This and other objects are accomplished in accordance with the invention with an elastically deformable rod, such as a spring leaf or a torsion rod, having two ends, each rod end being connected to a respective one of two sensing elements each engaged with both rails and spaced apart in the track elongation direction. A difference in the vertical positions of the rails deforms the rod in response to a vertical movement of a sensing element in response to the difference, and the deformation of the rod causes a strain to be set up therein. A resistance strain gage means is mounted on the rod for measuring the strain in the rod and generating an electrical measuring signal proportional to the movement of the sensing element causing the deformation of the rod and the resultant strain therein. An electrical measuring signal indicator is connected to the strain gage means for indicating the measuring signal.

The interconnection between the two sensing elements by an elastically deformable rod substantially excludes any play in the relative movements of the elements and thus produces a very simple as well as accurate measurement of such movements which, in turn, reflect the track camber. In addition, the use of resistance strain gage means produces a very hardy and simple means of generating the measuring signal, as more fully described and claimed in application Ser. No. 155,861, filed June 23, 1971 and entitled "Mobile Track Survey Apparatus for Determining a Track Parameter" of which the joint inventor Josef Theurer is also a joint inventor.

According to one embodiment of the present invention, the rod is a preferably tubular torsion rod having one end pivotally connected to, but non-rotatable in respect of, one of the sensing elements, for instance by means of a cup spring or a universal or cardan joint.

The rod preferably extends in the direction of track elongation and has its ends connected to the respective sensing elements substantially centrally between the rails. Preferred mountings of the strain gage means are more fully disclosed and claimed in the above-mentioned concurrently filed application.

In accordance with a preferred feature of this invention, not only the track camber but the track condition, i.e., the elastic deformations of the rails under a load, may be determined if one of the sensing elements is constituted by a running gear supporting the chassis of the apparatus and being under its load while a measuring gear vertically freely movably supported on the chassis constitutes the other sensing element. The track condition is of decisive importance to the operating safety of the track and, since the track survey car or the track correction machine incorporating the present apparatus is equivalent to a railroad car, its passage is equivalent thereto in determining the track condition. If the apparatus is used on a track tamping and leveling machine, for instance, the indicator includes the controls for the track working tools which will thus operate under the guidance of the measuring signals.

The above and other objects, advantages and features of the invention will be more fully understood by reference to the following detailed description of some now preferred embodiments thereof, taken in conjunction with the accompanying drawing wherein FIG. 1 is a side view of a track surveying car incorporating the instrumentation of the invention;

FIG. 2 is a schematic perspective view of one embodiment of the apparatus for determining the track camber;

FIG. 3 is an enlarged side view, partly in section, of the embodiment of FIG. 2;

FIG. 4 is a transverse section along line IV—IV of FIG. 3, showing a tubular torsion rod;

FIG. 5 is a transverse section along line V—V of FIG. 3;

FIG. 6 is a circuit diagram of a measuring signal generator and transmitter incorporating the strain gage means;

FIG. 7 is a horizontal section of the pivotal connection of one end of the flexible torsion rod of FIG. 3; and FIG. 8 is a section along line VIII—VIII of FIG. 7.

Referring now to the drawing, wherein like reference numerals designate like parts operating in a like manner in all figures, FIG. 1 shows a track survey car having a chassis 3 and a body 4. The chassis is supported on running gears 2, 2' whose wheels run on track rails 1, 1 so that the track survey car is mounted for mobility in the direction of track elongation. In the illustrated embodiment, the car is self-propelled, a drive motor 5 being connected to the axle of running gear 2 for moving the car along the track. Measuring gear units 6, 6', 6" are mounted on the chassis for vertically freely moving in respect of the chassis, the measuring gear unit 6' being arranged intermediate and substantially centrally between the running gears 2, 2' while measuring gear units 6 and 6'' are arranged in the respective end regions of the track survey car adjacent the running gears.

Each measuring gear comprises two lateral rail position sensing elements constituted by axles 9a, 9b and is mounted on the chassis by pivotal support rods 7 one of whose ends is pivoted to the underside of chassis 3. Obliquely outwardly directed hydraulic motors 8 connect respective axles of each measuring gear unit to the chassis so that each gear may be lifted off the track rails when not in use. Due to their outward bias, the hydraulic motors simultaneously serve to press the flanged wheels of the measuring axles 9a, 9b against a respective rail.

The ordinates, i.e., the lateral alignment of the track rails, are measured by all three measuring gear units 6, 6' and 6'' in a manner fully described and claimed in our application Ser. No. 155,851, filed June 23, 1971 and entitled "Mobile Track Survey Apparatus." The illustrated car also carries apparatus 15 for determining the track camber according to the present invention, computers 17 to which the measured signals may be fed, and signal indicator 12 and recorder 13.

One embodiment of the apparatus 15 is shown in FIGS. 2 and 3 which illustrate only one running gear 2', one of the end measuring gear units 6'' (used for surveying the alignment) and the center measuring gear unit 6' which is used for determining the camber in cooperation with running gear 2'. For this purpose, the axle of running gear 2' and the axle 9b of measuring gear unit 6' are interconnected by torsion rod 19, the two axles 9a, 9b of unit 6' being connected by link 25 whose ends are pivoted to the axles 9a, 9b to enable them to move vertically in respect to each other while being held against relative rotation, as clearly shown in FIG. 3. As shown in FIG. 4, the torsion rod 19 is tubular and of rectangular cross section, the strain gage strips 20 being mounted centrally between the ends of the rod on one face of the rod.

A rigid connecting tube 18, which resists rotation or twisting, is pivoted by cup spring 21 to axle 9b of unit 6' but held against rotation in respect thereof, another cup spring 21 pivotally but non-rotatably connecting one end of the torsion rod 19 to the outer end of the connecting tube. This mounting will be more fully described with reference to FIGS. 7 and 8. The mounting and operating of the electrical signal generator and transmitter 20 is more fully described and claimed in the above-mentioned application entitled "Mobile Track Survey Apparatus for Determining a Track Parameter".

As best shown in FIGS. 7 and 8, a trunnion 22 is journaled in a bearing 24 mounted on link 23 projecting from the underside of chassis 3. The outer end of connecting tube 18 has a collar 35 screwed to two of the diametrically opposed arms 21a, 21a of a cruciform cup spring 21 which is rigid against rotation. The two other diametrically opposed arms 21b, 21b of the cup spring are screwed to a collar 36 which extends perpendicularly to collar 35 (see FIG. 8) and is welded to trunnion 22, thus holding the trunnion against rotation in respect of the connecting tube 18 while transmitting the torque from tube 18 to trunnion 22 without play. At the same time, this connection permits oblique relative positioning of the tube 18 in respect of trunnion 22 so that a vertical or lateral movement of the measuring gear unit 6' in respect of torsion rod 19 may be balanced.

The trunnion has a spherical bearing 24a journaled in conforming race 24b of bearing 24 to form a universal joint for support of the trunnion 22 so as to balance also any vertical and/or lateral movement of the running gear 2' to which is connected the torsion rod 19. The other end of trunnion 22 has threadedly mounted thereon a collar 37 which, in turn, is threadedly connected with a collar 38 welded to the one end of torsion rod 19 so that the torque between the torsion rod and the trunnion 22 is also transmitted without play.

FIG. 5 illustrates the mounting of the bearing 24 on links 23. It also shows the connection between axle 9b and one end of the connecting tube 18 by means of a triangular bracket 31.

FIG. 6 schematically illustrates the circuit diagram of a measuring signal generator and transmitter incorporating four strain gage strips 20 in a measuring bridge which receives current from a supply circuit through operating voltage stabilizer 32. The measuring signal is fed from the bridge to carrier frequency amplifier 33 which is also energized through stabilizer 32, and the amplified signal is rectified, further amplified and filtered, if desired, at 34 whence it is transmitted to the indicator instrument 12 and the signal recorder 13 which makes a permanent record of the recorded signals.

We claim:

1. A mobile track survey apparatus for determining the camber of a track having two rails, the apparatus having a chassis mounted for mobility on the track rails for movement in the direction of track elongation and comprising
    1. two axles mounted on the chassis and spaced from each other in the track elongation direction,
        a. each axle carrying a pair of rail sensing elements and the rail sensing elements defining a rectangle of four rail points whose relative vertical position is being surveyed by the rail sensing elements;
    2. a rod elastically deformable in at least a portion thereof and extending between the two axles substantially in the direction of track elongation;
    3. means connecting a respective end of the rod to a respective one of the axles,
        a. the connecting means comprising means for preventing relative rotation between the rod end and axle about an axis extending in the direction of track elongation whereby
        b. rotation of one of the axles relative to the other axle in response to a change in the vertical position of any one of the rail points surveyed by the rail sensing elements carried by the axles causes a deformation of the elastically deformable rod portion and
        c. deformation of the rod portion causes a strain to be set up therein;
    4. a strain gage mounted on the flexible rod portion for measuring the strain therein,
        a. the strain gage generating an electrical measuring signal proportional to the relative movement of the axles and the resultant strain; and
    5. an electrical measuring signal indicator connected to the strain gage for indicating the measuring signal.

2. The mobile track survey apparatus of claim 1, wherein the elastically deformable rod portion is a torsion rod extending centrally between the track rails in said direction.

3. The mobile track survey apparatus of claim 2, wherein the torsion rod is of rectangular cross section having two wide sides substantially parallel to the track plane, the strain gage being mounted on one of the sides.

4. The mobile track survey apparatus of claim 2, wherein the torsion rod is tubular.

* * * * *